Aug. 30, 1949.

J. L. AASLAND 2,480,209

CORN HARVESTER

Filed Nov. 22, 1943

Inventor:
John L. Aasland
By: Paul O. Pippel

Patented Aug. 30, 1949

2,480,209

UNITED STATES PATENT OFFICE 2,480,209

CORN HARVESTER

John L. Aasland, Moline, Ill., assignor to International Harvester Company, a corporation of New Jersey Application November 22, 1943, Serial No. 511,261

5 Claims. (Cl. 56—119)

This invention relates to a corn harvester.

Conventional corn harvesters of the snapper type comprise a machine having a passageway through which the standing stalks in a field pass as the machine travels along. In this passageway is usually disposed a pair of oppositely rotating snapping rolls arranged longitudinally and spaced apart to receive the stalks and pull them downwardly through the rolls so that corn ears may be pinched or snapped from the stalks. Gather chains usually run parallel with the snapping rolls at the sides of the passageway to hold and move the stalks with respect to the rolls. In some conditions the rolls are too aggressive and damage the butt ends of the ears and cause severe shelling of corn.

The purpose of this invention is to provide an improved and simplified corn-snapping mechanism.

The main object of the invention is to provide a novel corn-snapping arrangement for corn harvesters.

Another object is to combine the function of carrier chains and snapping means in one mechanism.

Another object is to provide a novel chain means cooperating with the rolls, the chain means serving to snap the ears and also to forward the ears to a point of discharge.

Other objects will become known as this disclosure is more fully made.

These objects are achieved in the illustrative example of the invention herein disclosed, by arranging over a pair of stalk pull-down rolls a pair of chains having opposed runs running across the top of the rolls in close proximity thereto, each chain having inwardly projecting fingers which are closely spaced on the chains and alternately interfit with similar fingers on the opposed chain means. These fingers thus bridge the space between the rolls so that they serve to strip ears from stalks held by the rolls and extending upwardly therethrough. The chains thus are dual function chains in that they act as stalk carriers and ear strippers. They also serve the functions of ear-forwarding chains after the ears are stripped from the stalks.

Figures 1, 2, 3:
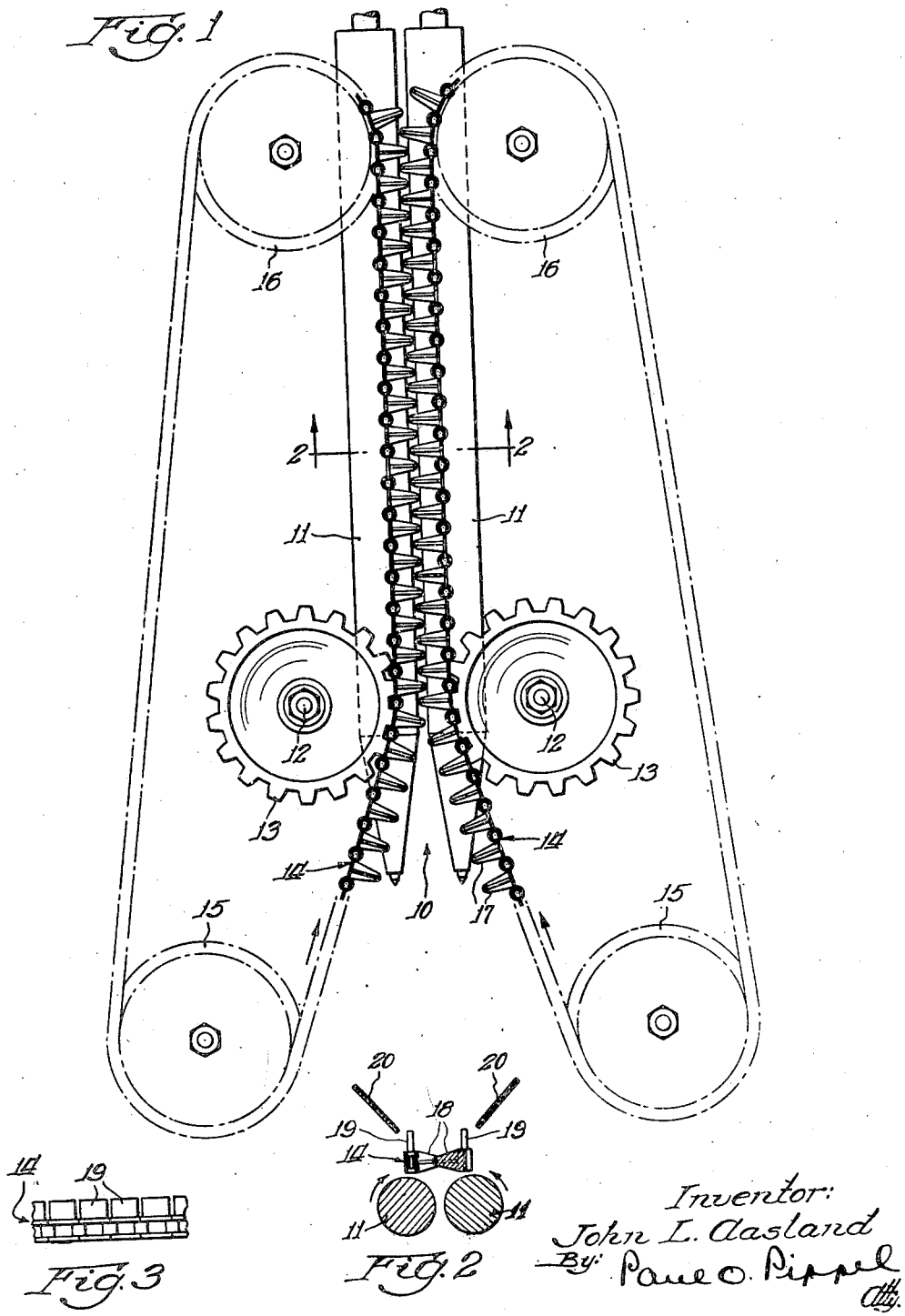
Figure 1 is a general plan view of the improved structure.
Figure 2 is a general cross-sectional view taken along the line 2—2 of Figure 1 looking in the direction of the arrows.
Figure 3 is a side view of a length of the chain means.

In the drawings, the corn harvester, it will be understood, includes the usual framework, not shown, which provides a stalk passageway 10 in which is disposed a pair of parallel, longitudinally and rearwardly and upwardly inclined rolls 11, which, as shown in Figure 2, rotate oppositely in the direction indicated by the arrows in that figure. On opposite sides of the passageway 10, suitable vertical shafts 12, at their upper ends, carry sprocket wheels 13, around the inner edges of which are respectively trained link-belt type chains 14. These chains 14 are endless, as shown, and are guided around respective sprocket wheels 15 and 16. By means of the sprocket wheels 13 and 16, an inner run of each chain 14 is caused to move over a respective roll 11 in the manner shown. These chains operate in a plane closely adjacent and above the rolls 11. Each chain 14 has each of its links provided with laterally projecting fingers 17 of a length sufficient to overlap the space between the rolls 11. These fingers 17 are closely spaced on each chain, and, as shown in Figure 1, the opposed runs of the chains over the rolls have their respective fingers alternately disposed to bridge the space between the rolls at a point thereabove.

Each finger 17 provides, near its base line, a broad area and the side edges of each finger converge toward the point where they are disposed over the space between the rolls. Further, as shown in Figure 2, the top side of each finger 17 is sloped downwardly, as at 18, so that opposed fingers on opposite runs of the chains in effect form a trough. Certain or all of the chain links in addition, at their base ends, may carry upright wall elements 19 to emphasize the trough arrangement of the chain runs where they oppose each other and run along the rolls 11. At opposite sides of the side edges of the chains where they run across the rolls, side trough plates 20 may be provided if desired.

In operation, the corn harvester will travel along a row of standing stalks so that the stalks will pass into the passageway 10 and be received and held between the fingers 17 on the opposed chain runs so that these fingers in effect perform the function of stalk-carrier chains. Eventually, the stalks pass into the narrow space between the rolls, which, running oppositely toward one another, grab the stalks and pull them downwardly so that any ears thereon will engage the interfitting ends of the fingers 17 which bridge the space between the rolls to cause such ears to be stripped from the stalks. The ears then fall down and lodge in the trough arrangement formed by the opposed run of the chains by virtue of the slope 18 and with the aid of side plates 20, so that the chains additionally serve the function of an ear-forwarding chain, carrying the ears rearwardly to a point of discharge, it being understood, of course, that the opposed run of the chains above the snapping rolls constantly move only rearwardly. While it is not necessary, nevertheless it is preferable that the opposed runs of the chains over the snapping rolls lie in the same plane.

From this description, it will now be apparent that a simplified and improved stalk-handling and ear-snapping arrangement has been provided which achieves the objects of the invention heretofore recited. The fingers 17, since they bridge the space over the rolls, make it impossible for the rolls to engage the ears and damage them.

It is the intention to cover all changes and modifications of the example shown which do not depart from the spirit and scope of my invention.

What is claimed is:

1. In a corn harvester having a stalk passage formed therein, a pair of longitudinal parallel spaced rolls located in said passage and rotating in opposite directions to engage and pull stalks downwardly therebetween, endless chains respectively disposed at each side of the passage, each chain having a run running rearwardly over each roll, and closely arranged fingers on each chain extending laterally inwardly over and to bridge the space between the rolls, the fingers on one chain over said space being disposed to interfit alternately with the fingers on the opposite run to snap ears from a stalk being pulled downwardly, said fingers being closely spaced to prevent engagement of the ears with the snapping rolls, whereby the chains with their fingers act as a sole means to snap ears from the stalks and to convey them to a point of discharge.

2. In a corn harvester having a stalk passage formed therein, a pair of longitudinal parallel spaced rolls located in said passage and rotating in opposite directions to engage and pull stalks downwardly therebetween, endless chains respectively disposed at each side of the passage, each chain having a run running rearwardly over each roll, and closely arranged fingers on each chain extending laterally inwardly over and to bridge the space between the rolls, the fingers on one chain over said space being disposed to interfit alternately with the fingers on the opposite run to snap ears from a stalk being pulled downwardly, said fingers being closely spaced to prevent engagement of the ears with the rolls, said chain runs lying in the same plane and in close proximity to the snapping rolls, whereby the chains with their fingers act as the sole means to snap ears from the stalks and to convey them to a point of discharge.

3. In a corn harvester having a stalk passage formed therein, a pair of longitudinal parallel spaced rolls located in said passage and rotating in opposite directions to engage and pull stalks downwardly therebetween, endless chains respectively disposed at each side of the passage, each chain having a run running rearwardly over each roll, and closely arranged fingers on each chain extending laterally inwardly over and bridging the space between the rolls, the fingers of one chain over said space being disposed to interfit alternately with the fingers on the opposite run to snap ears from a stalk being pulled downwardly, said fingers being closely spaced to prevent engagement of the ears with the snapping rolls, said chain runs lying in the same plane and in close proximity to the rolls, each finger being relatively wide at its base and and having side edges converging toward the free end thereof, whereby the chains with their fingers act as the sole means to snap ears from the stalks and to convey them to a point of discharge.

4. In a corn harvester having a stalk passage formed therein, a pair of longitudinal parallel spaced rolls located in said passage and rotating in opposite directions to engage and pull stalks downwardly therebetween, endless chains respectively disposed at each side of the passage, each chain having a run running rearwardly over each roll, and closely arranged fingers on each chain extending laterally inwardly over and bridging the space between the rolls, the fingers on one chain over said space being disposed to interfit alternately with the fingers on the opposite run to snap ears from a stalk pulled downwardly, said fingers being closely spaced to prevent engagement of the ears with the snapping rolls, said chain runs lying in close proximity to the snapping rolls, and each finger having a relatively broad top area and sloping inwardly and downwardly so that the alternate interfitting teeth of the opposite chain runs form a trough to receive snapped ears whereby said chains not only act as ear strippers but as ear conveyors.

5. In a corn harvester having a stalk passage formed therein, a pair of longitudinal parallel spaced rolls located in said passage and rotating in opposite directions to engage and pull stalks downwardly therebetween, endless chains respectively disposed at each side of the passage, each chain having a run running rearwardly over each roll, and closely arranged fingers on each chain extending laterally inwardly over and bridging the space between the rolls, the fingers on one chain over said space being disposed to interfit alternately with the fingers on the opposite run to snap ears from a stalk being pulled downwardly, said fingers being closely spaced to prevent engagement of the ears with the snapping rolls, said chain runs lying in close proximity to the snapping rolls, said chains at their outer edges including raised elements to form an ear-forwarding trough.

JOHN L. AASLAND.

REFERENCES CITED

The following references are of record in the file of this patent:

UNITED STATES PATENTS

| Number | Name | Date |
| --- | --- | --- |
| 461,246 | Meader | Oct. 13, 1891 |
| 889,226 | Hall | June 2, 1908 |
| 1,012,938 | Umbanhowar | Dec. 26, 1911 |
| 1,023,320 | Kaull | Apr. 16, 1912 |
| 1,708,327 | Riley | Apr. 9, 1929 |
| 1,734,972 | Johnson | Nov. 12, 1929 |
| 1,800,058 | Dugger | Apr. 7, 1931 |
| 2,134,867 | Fergason | Nov. 1, 1938 |

FOREIGN PATENTS

| Number | Country | Date |
| --- | --- | --- |
| 327,301 | Great Britain | Apr. 3, 1930 |

Certificate of Correction

Patent No. 2,480,209                                                       August 30, 1949

JOHN L. AASLAND

It is hereby certified that errors appear in the printed specification of the above numbered patent requiring correction as follows:

Column 3, line 70, for the words "of one" read *on one*; column 4, line 6, for "base and" read *base end*;

and that the said Letters Patent should be read with these corrections therein that the same may conform to the record of the case in the Patent Office.

Signed and sealed this 7th day of February, A. D. 1950.

[SEAL]

THOMAS F. MURPHY,
*Assistant Commissioner of Patents.*